US010860060B1

(12) United States Patent
Ranjan et al.

(10) Patent No.: US 10,860,060 B1
(45) Date of Patent: Dec. 8, 2020

(54) BATTERY PROTECTION AND INTELLIGENT COOLING FOR COMPUTING DEVICES

(71) Applicant: EMC IP Holding Company LLC, Hopkinton, MA (US)

(72) Inventors: Alok Ranjan, Bangalore (IN); Dinesh Kanayalal, Bangalore (IN); Anshul Saxena, Bareilly (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/664,211

(22) Filed: Oct. 25, 2019

(51) Int. Cl.
*H05K 5/00* (2006.01)
*G06F 1/16* (2006.01)
*H01M 2/10* (2006.01)
*H01M 10/6566* (2014.01)

(52) U.S. Cl.
CPC ............ *G06F 1/1635* (2013.01); *G06F 1/166* (2013.01); *H01M 2/1022* (2013.01); *H01M 10/6566* (2015.04)

(58) Field of Classification Search
CPC ..................... H05K 2201/10159; G06F 1/1635
See application file for complete search history.

(56) References Cited

U.S. PATENT DOCUMENTS

| 5,594,617 | A | 1/1997 | Foster et al. |
| 5,649,750 | A | 7/1997 | Ishii et al. |
| 6,002,583 | A | 12/1999 | Shoji et al. |
| 2007/0041157 | A1 * | 2/2007 | Wang ...................... G06F 1/203 361/679.54 |
| 2010/0330400 | A1 * | 12/2010 | Hu ...................... H01M 2/1061 429/50 |

FOREIGN PATENT DOCUMENTS

WO 9607209 A1 3/1996

* cited by examiner

*Primary Examiner* — Jerry Wu
(74) *Attorney, Agent, or Firm* — Ryan, Mason & Lewis, LLP

(57) ABSTRACT

An apparatus includes a housing, at least one processing device disposed within the housing and comprising a processor coupled to a memory, one or more sensors communicatively coupled to the processing device, one or more batteries configured to provide electrical power to the processing device, and one or more battery position actuators configured to modify a positioning of the one or more batteries relative to the housing. The processing device is configured to perform steps of obtaining information from the one or more sensors characterizing an operating state of the apparatus, monitoring the obtained information to detect one or more designated conditions affecting a health of the one or more batteries, and, responsive to detecting at least one of the one or more designated conditions, triggering the one or more battery position actuators to modify the positioning of the one or more batteries relative to the housing.

20 Claims, 10 Drawing Sheets

| SOURCE | HEAT |
|---|---|
| BATTERY CHARGING | ~ 40 – 50 DEGREES CELSIUS |
| BATTERY DISCHARGING | ~ 30 DEGREES CELSIUS |
| PROCESSOR DURING HIGH USAGE | ~ 40 – 50 DEGREES CELSIUS |

700

| SOURCE | HEAT DISCHARGE % |
|---|---|
| BATTERY CHARGING | 70% |
| BATTERY DISCHARGING | N/A |
| PROCESSOR DURING HIGH USAGE | 60% |

BATTERY PROTECTION AND INTELLIGENT COOLING FOR COMPUTING DEVICES

FIELD

The field relates generally to computing devices, and more particularly to techniques for managing batteries of computing devices.

BACKGROUND

Various computing devices are equipped with batteries to enable portable or mobile computing. Some types of batteries, such as lithium-ion (Li-ion)-based batteries widely used in laptop computing devices, need care to preserve battery health over their associated lifespan. Battery lifespan can be damaged by self-heating during charging, as well as from heat generated by other components within an enclosure or other housing. For example, laptop computing devices may be designed to be small and portable, such that components thereof, including a processor and the battery, are in close proximity. During periods of high usage when the processor is heavily utilized, significant heat is generated that can potentially affect the health of the battery. Such effects are compounded when the battery is charging and thus also self-heating.

SUMMARY

Illustrative embodiments of the present disclosure provide techniques for battery protection and intelligent cooling for computing devices such as laptop computers.

In one embodiment, an apparatus comprises a housing, at least one processing device disposed within the housing and comprising a processor coupled to a memory, one or more sensors communicatively coupled to the at least one processing device, one or more batteries configured to provide electrical power to the at least one processing device, and one or more battery position actuators configured to modify a positioning of the one or more batteries relative to the housing. The at least one processing device is configured to perform steps of obtaining information from the one or more sensors characterizing an operating state of the apparatus, monitoring the obtained information to detect one or more designated conditions affecting a health of the one or more batteries, and, responsive to detecting at least one of the one or more designated conditions, triggering the one or more battery position actuators to modify the positioning of the one or more batteries relative to the housing.

These and other illustrative embodiments include, without limitation, methods, apparatus, networks, systems and processor-readable storage media.

BRIEF DESCRIPTION OF THE DRAWINGS

FIG. 7 shows tables of heat generated by a battery of a computing device and heat discharged utilizing battery protection and intelligent cooling techniques described herein in an illustrative embodiment.

DETAILED DESCRIPTION

Figure 1:
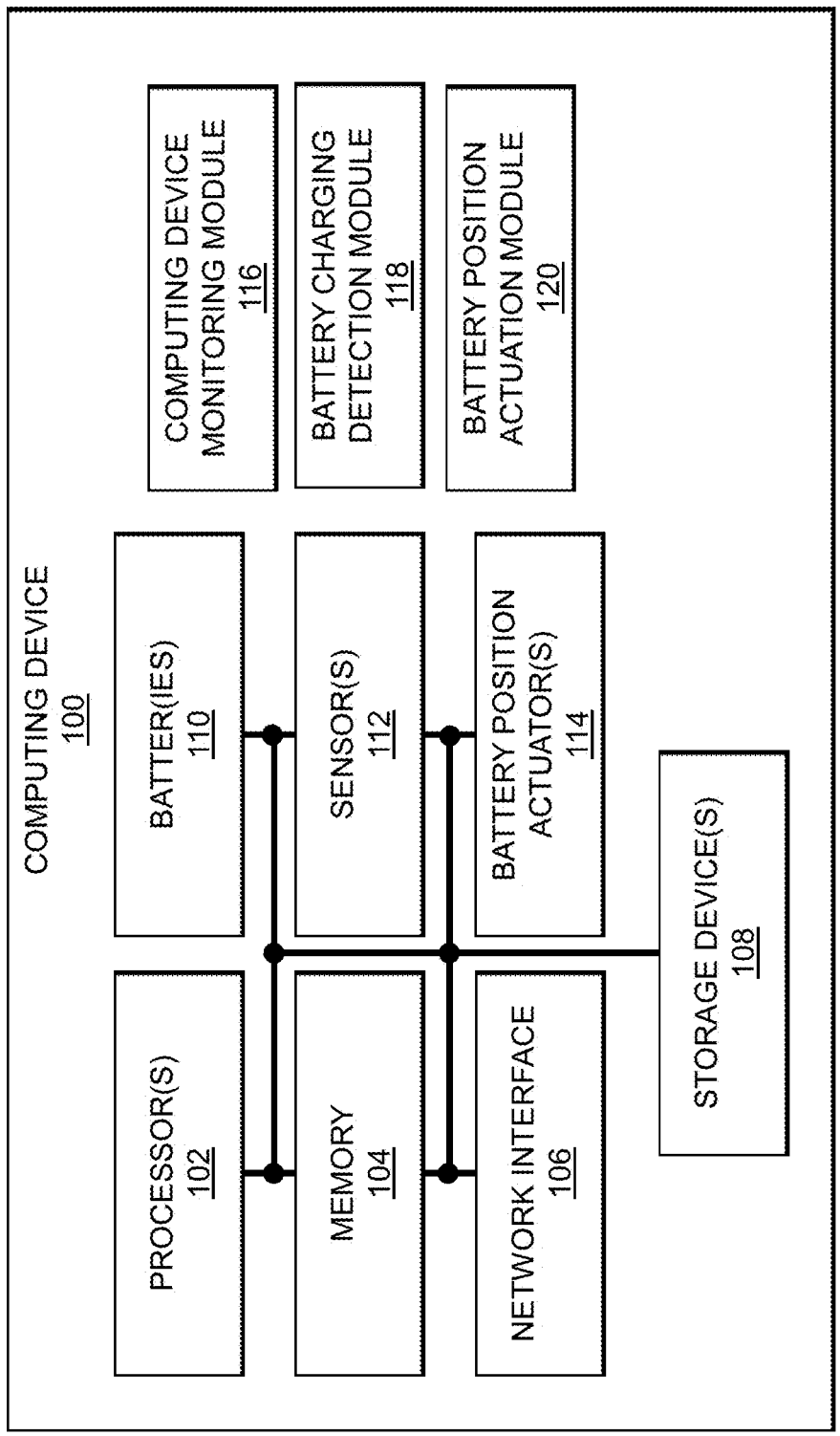
FIG. 1 is a block diagram of a computing device configured for battery protection and intelligent cooling thereof in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As noted above, various computing devices are equipped with batteries to enable portable or mobile computing, including laptop computing devices (also referred to herein as laptops). The usefulness of a laptop or other computing device may in some cases be defined by how long it is able to perform, which is dependent on battery life. The laptop or other computing device can also be defined by how much it is able to perform (e.g., by processor speed). High performance or high usage will typically stress the battery, and thus there is a direct dependency between performance and battery health.

Some types of batteries, such as lithium-ion (Li-ion)-based batteries widely used in laptop computing devices, need care to preserve battery health over its associated lifespan. Battery lifespan can be damaged by self-heating during charging, as well as from heat generated by other components within an enclosure or other housing. For example, laptop computing devices may be designed to be small and portable, such that components thereof including a processor and the battery are in close proximity. During periods of high usage when the processor is heavily utilized, significant heat is generated that can potentially affect the health of the battery. Such effects are compounded when the battery is charging and thus also self-heating.

Illustrative embodiments provide improved battery protection and intelligent cooling for computing devices such as laptops, advantageously enabling greater battery life and better performance. In some embodiments, battery protection and intelligent cooling are enabled through battery position actuators configured to auto-eject at least a portion of at least one battery from an enclosure, chassis or other housing of a computing device such as a laptop. By at least partially ejecting at least a portion of at least one battery from the housing, open space for air ventilation is created resulting in better cooling. Also, as at least a portion of at least one battery is ejected to be outside the housing, the heat dissipation area of the at least one battery is increased thus reducing self-heating of the at least one battery.

Advantageously, battery position actuators of a laptop are able to modify the position of one or more batteries relative to a housing of the laptop to create dynamic air ventilation ducts. Heat or temperature sensors may be used to monitor a temperature of the batteries or other portions of the laptop (e.g., locations on the housing, at components such as the processor of the laptop, etc.) to automatically trigger the battery position actuators to adjust or modify the position of the one or more batteries of the laptop to reduce adverse heating effects as described herein.

While the techniques described herein are well-suited for use in laptops, it should be appreciated that embodiments are not limited to use with laptops. The techniques described herein may more generally be utilized with any type of computing device that utilize batteries, including but not limited to smartphones, tablets, convertible computing devices (e.g., "2-in-1" laptops capable of configuration as a laptop or a tablet), etc.

FIG. 1 illustrates a computing device 100 configured for battery protection and intelligent cooling. In the description below, it is assumed that the computing device 100 is a laptop computing device. As noted above, however, various other types of computing devices may be configured for battery protection and intelligent cooling. The computing device comprises one or more processors 102 coupled to a memory 104, network interface circuitry 106, and one or more storage devices 108.

Each of the one or more processors 102 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 104 may comprise random access memory (RAM), read-only memory (ROM), flash memory or other types of memory, in any combination. The memory 104 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

The network interface circuitry 106 is used to interface the computing device 100 with a network (not shown), and may comprise conventional transceivers. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The storage devices 108 may comprise solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various other combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The processors 102, memory 104, network interface circuitry 106 and storage devices 108 are part of at least one processing device that is illustratively disposed within a housing of the computing device 100. The computing device 100 further includes one or more batteries 110 configured to provide electrical power to the computing device 100. In the description below, it is assumed that the batteries 110 are Li-ion batteries made of multiple cells. Each of the cells of a Li-ion battery may hold approximately 3.9-4.1 Volts (V). In some cases, a laptop utilizes 6 cells to get a desired voltage and current. Multiple battery cells may be connected in series to achieve a desired operational voltage, and sets of cells connected in series may be connected in parallel to achieve a desired current and more power (e.g., in terms of wattage).

Figure 2:
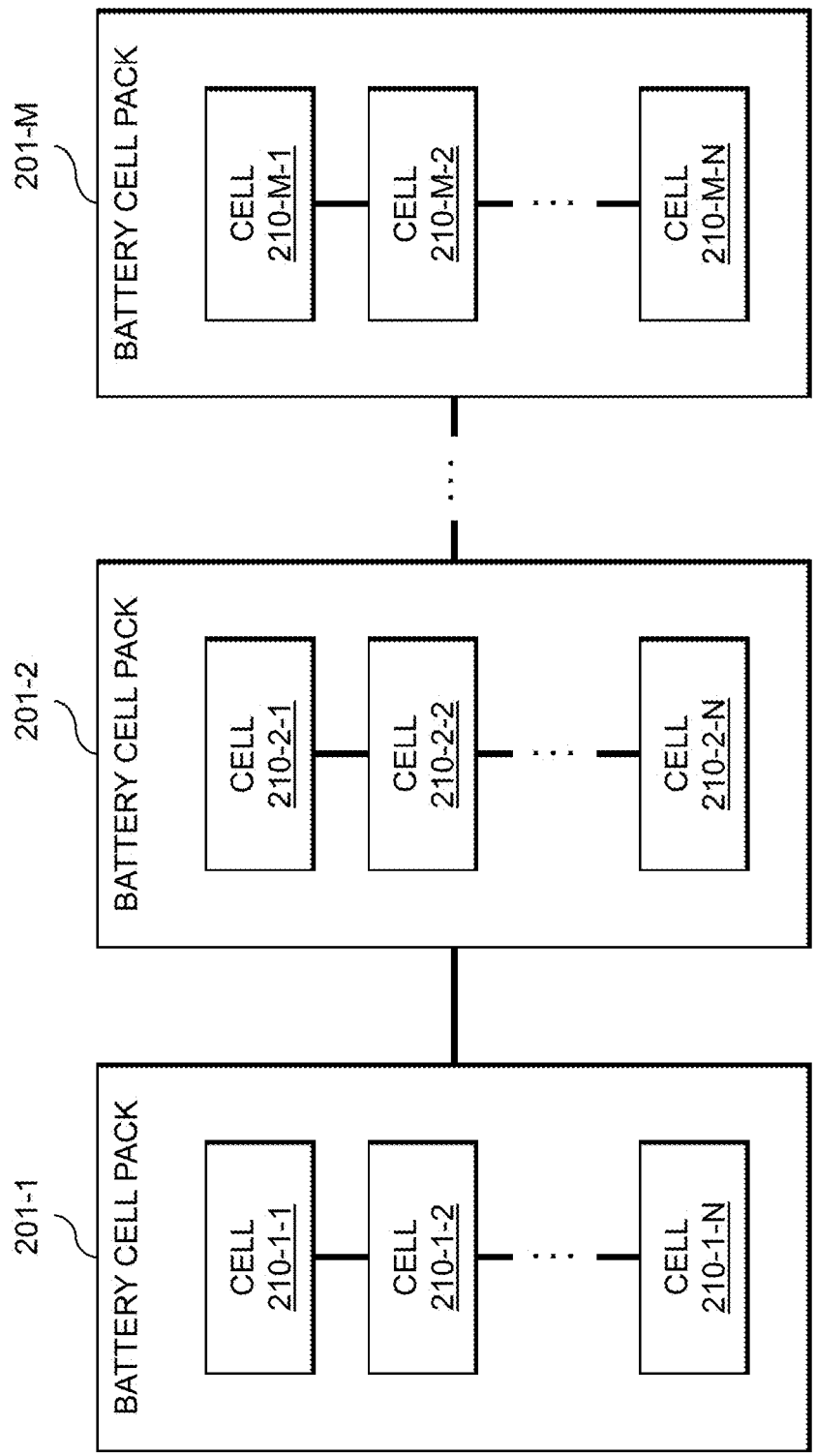
FIG. 2 is a block diagram of battery cell packs in an illustrative embodiment.

FIG. 2 illustrates how the batteries 110 of computing device 100 may be arranged in a set of battery cell packs 201-1, 201-2, . . . 201-M (collectively, battery cell packs 201). Each of the battery cell packs 201 comprises multiple cells. For example, battery cell pack 201-1 includes battery cells 210-1-1, 210-1-2, . . . 210-1-N (collectively, battery cells 210-1), battery cell pack 201-2 includes battery cells 210-2-1, 210-2-2, . . . 210-2-N (collectively, battery cells 210-2), and battery cell pack 201-M includes battery cells 210-M-1, 210-M-2, . . . 210-M-N (collectively, battery cells 210-M). It should be appreciated that the number M of battery cell packs may vary, and that in some cases there is only a single battery cell pack rather than multiple battery cell packs. Further, it should be noted that the particular number of cells "N" in each of the battery cell packs 201 need not necessarily be the same and may vary as desired. For example, the value of "N" in battery cell pack 201-1 may be different than the value of "N" in battery cell pack 201-2, etc.

Embodiments described below in the context of FIGS. 3A-3B and 4A-4B assume that the computing device 100 is a laptop with two sets of battery cell packs each with three battery cells which are electrically coupled to one another (e.g., the cells within each battery cell pack being coupled in series, and the battery cell packs being coupled in parallel). In other embodiments, however, more or fewer battery cell packs may be utilized, and each battery cell pack may include more or fewer than three battery cells. Further, in some cases different battery cell packs may include different numbers of cells. Depending on the layout of other components within the housing of a laptop, it may be desired to have differing size battery cell packs to fit components within a smaller housing footprint, or to distribute heat more evenly by having differing-sized battery cell packs adjacent to other components that produce different amounts of heat during operation thereof. For example, a GPU or graphics card may produce more heat than a storage device such as a SSD, and thus a "smaller" battery cell pack may be placed near the GPU and a "larger" battery cell pack may be placed near the SSD or other storage device.

The computing device 100 also includes one or more sensors 112 communicatively coupled to the processors 102, and one or more battery position actuators 114 configured to modify a positioning of the one or more batteries 110 relative to the housing of the computing device 100. The sensors 112 may comprise temperature sensors for monitoring a temperature of the one or more batteries 110, locations associated with a housing of the computing device 100, etc. The sensors 112 may also be configured to monitor various components of the computing device 100 to directly measure the temperature thereof, to infer the temperature thereof, to determine one or more heat generating conditions, etc. For example, one or more of the sensors 112 may be configured to monitor load on the processor 102. If the processor 102 is under high load or usage (e.g., usage above some designated threshold), it is expected that heat generated by the processor 102 will heat other components or portions of the computing device 100 including the batteries 110. As another example, one or more of the sensors 112 may be configured to detect when the batteries 110 are charging, which will cause the batteries 110 to self-heat. In some embodiments, the sensors 112 include one or multiple sensors configured to perform combinations of the above (e.g., directly measuring a temperature of the batteries 110 or other components or locations associated with a housing of the computing device 100, determining load or usage of the computing device 100 or components thereof, detecting when the batteries 110 are charging, etc.).

Figure 3A:
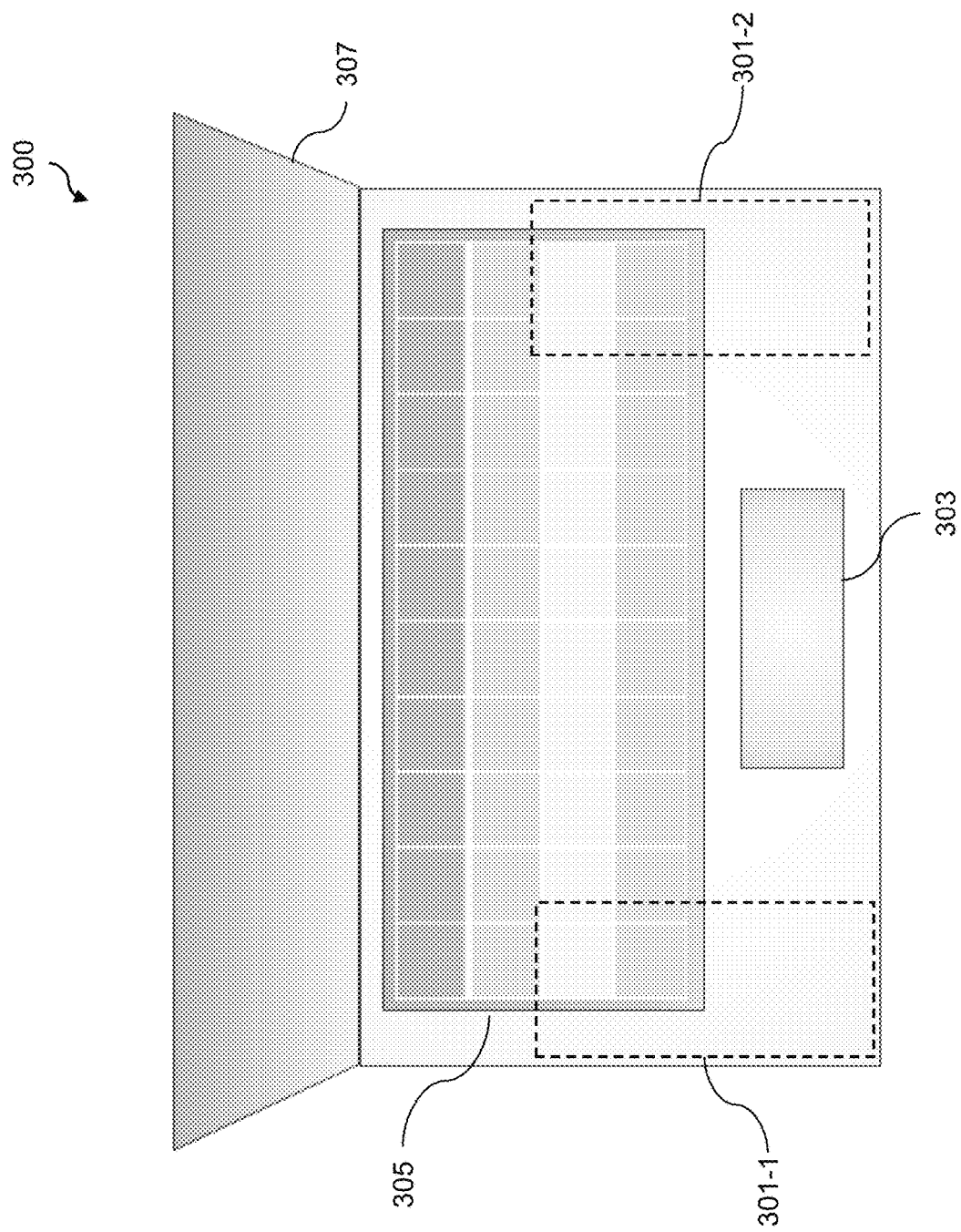
FIGS. 3A and 3B show actuation of battery position actuators for battery protection and intelligent cooling a laptop device in an illustrative embodiment.
Figure 3B:
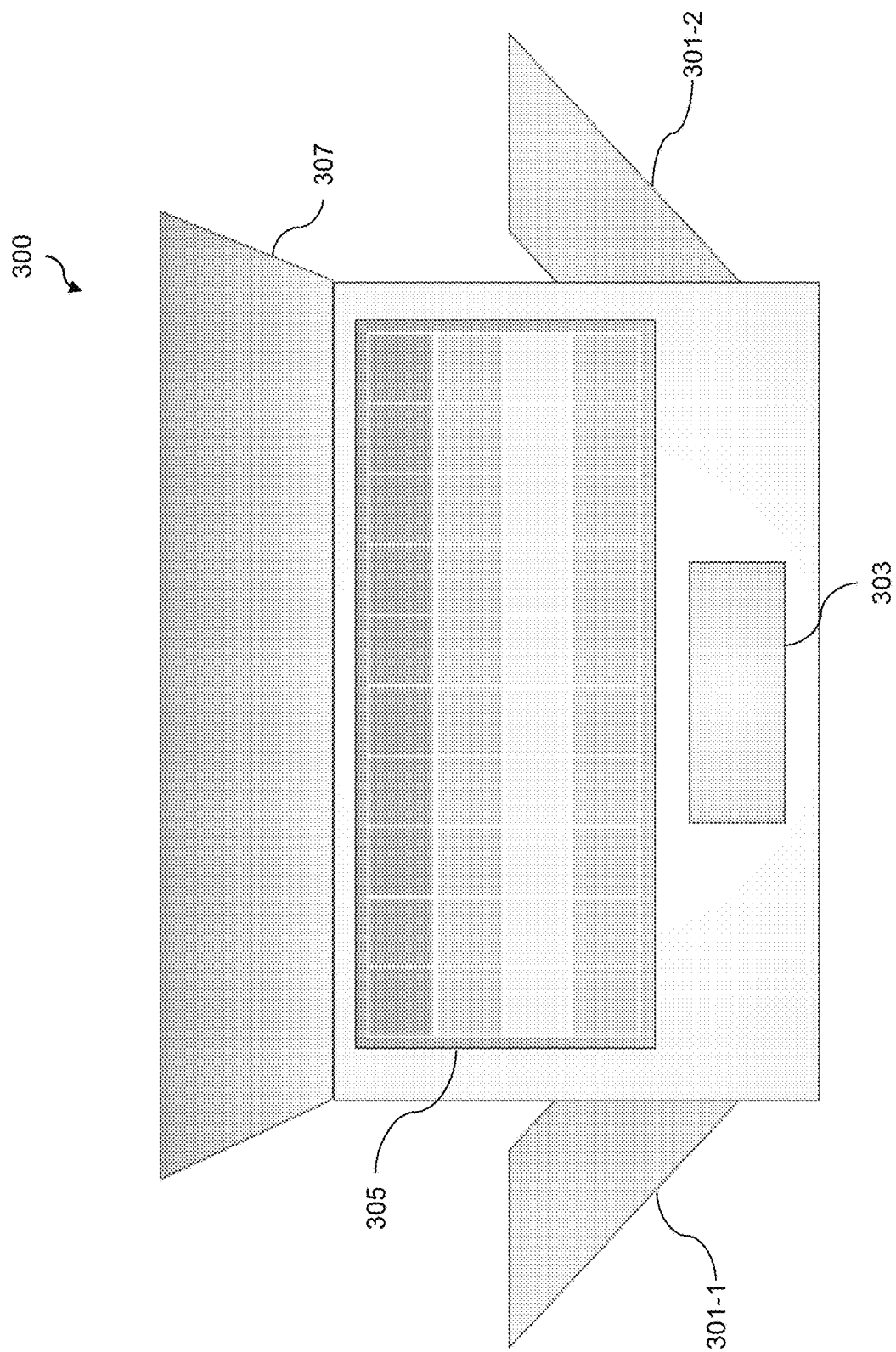
Figure 4A:
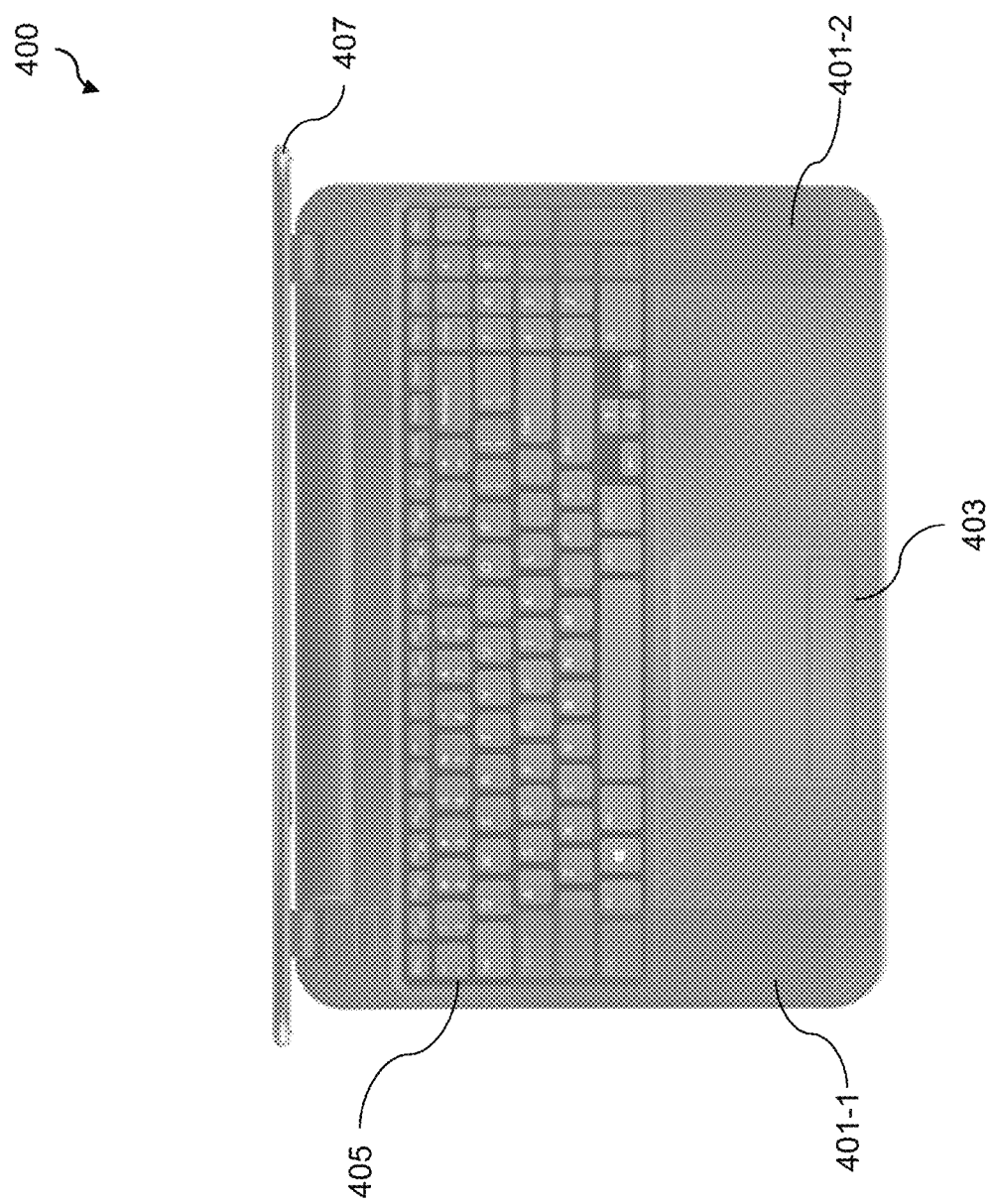
FIGS. 4A and 4B show actuation of battery position actuators for battery protection and intelligent cooling a laptop device in an illustrative embodiment.
Figure 4B:
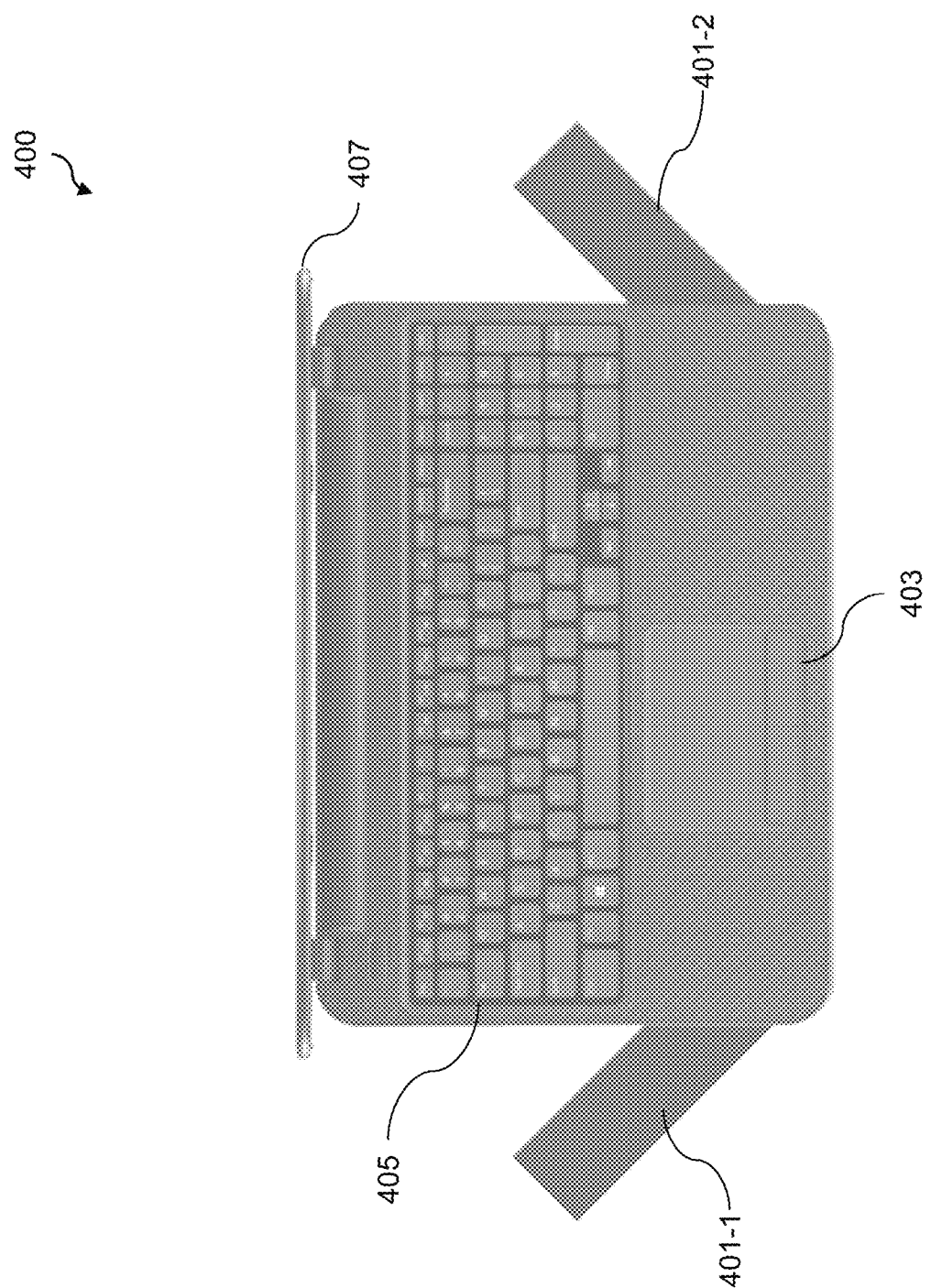

The battery position actuators 114 comprise mechanical or electromechanical actuators configured to alter the position of the batteries 110 with respect to a housing of the computing device 100. The batteries 110, for example, may be arranged as a pair of battery cell packs 301-1 and 301-2 (collectively, battery cell packs 301) or 401-1 and 401-2 (collectively, battery cell packs 401) that are placed at "left" and "right" sides of a laptop 300 or 400 as illustrated in FIGS. 3A-3B and 4A-4B. FIGS. 3A-3B and 4A-4B illustrate various other components of the laptops 300 and 400, including respective trackpads 303, 403, keyboards 305, 405 and displays 307, 407. The battery position actuators 114 may comprise rotational angular brackets which cause the battery cell packs 301 and 401 to "pop out" of the housing of the laptops 300 and 400 at an angle (e.g., a 45 degree angle as illustrated in FIGS. 3B and 4B). This pop out action will create dynamic air ducts at the left and right sides of the laptops 300 and 400, resulting in improved air ventilation.

The battery position actuators 114 may trigger the rotational angular brackets to pop out whenever one or more designated heat conditions are detected (e.g., as controlled by heat sensors, monitoring load, detecting battery charging, etc.). The rotational angular brackets are configured to be pushed back inside the housing of the laptops 300 and 400 via a manual push, and can be locked by a physical button if desired. In some embodiments, instead of "pop out" rotational angular brackets, the battery position actuators 114 may provide electromechanical actuators that automatically rotate or extend portions of the battery cell packs 301, 401 (or more generally batteries 110) outside the housing of the laptops 300, 400 (or more generally, outside the housing of the computing device 100) responsive to detection of one or more conditions affecting the health of the battery cell packs 301, 401 (e.g., one or more designated heat conditions).

Figure 5:
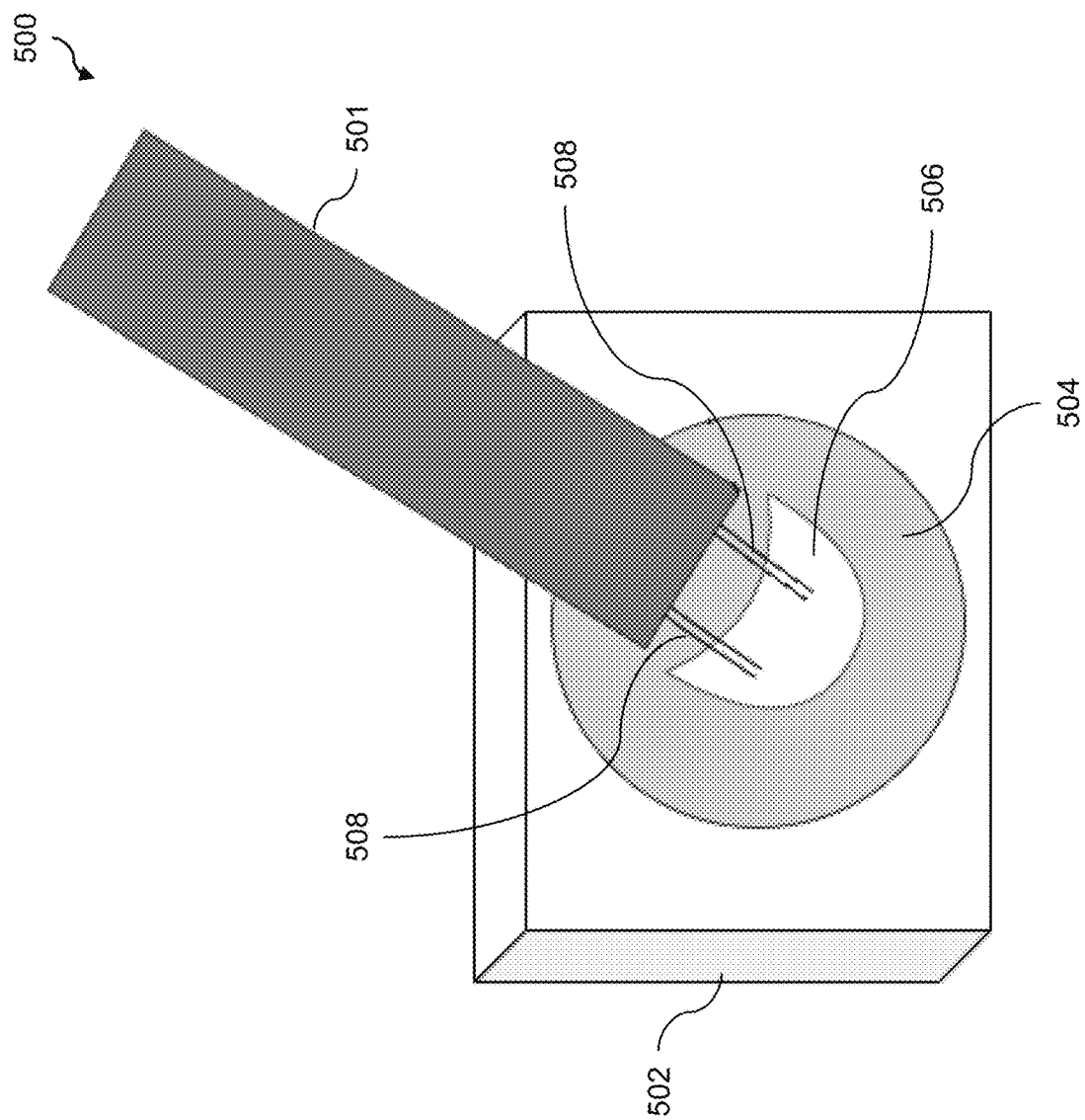
FIG. 5 shows a top-down view of a rotational angular bracket providing a battery position actuator in an illustrative embodiment.

FIG. 5 shows a top-down view of a battery position actuator 500 implemented as a rotational angular bracket. The battery position actuator 500 includes an actuator base 502, a fixed disc 504, a rotatable disc 506, and connectors 508 (e.g., screws or other fasteners) that couple the rotatable disc 506 to a battery 501.

Figure 6:
FIG. 6 shows a table of battery life data in an illustrative embodiment.

FIG. 6 shows a table 600 of battery life data, indicating the correlation between heat that a battery is exposed to over a period of one year and the decrease in lifespan of the battery. FIG. 7 shows a table 700 indicating heat generated from various sources, including heat generated by a battery charging, a battery discharging and a processor during high usage. FIG. 7 also shows a table 705 indicating an amount of heat discharged from the same sources using the techniques described herein for battery protection and intelligent cooling.

The computing device 100 is configured to implement a number of functional modules for providing battery protection and intelligent cooling functionality as described herein. Such functional modules include a computing device monitoring module 116, a battery charging detection module 118 and a battery position actuation module 120. The computing device monitoring module 116 is configured to utilize information from the sensors 112 to monitor various aspects of the computing device 100, such as temperature at various positions within or otherwise associated with the housing, temperature of components of the computing device 100 (e.g., components including but not limited to the processor 102, the storage devices 108, and the batteries 110 that have built-in sensors or functionality for reporting temperature readings), load of various components of the computing device 100, etc. The battery charging detection module 118 is configured to monitor the batteries 110 to determine when the batteries 110 are charging and discharging.

The battery position actuation module 120 is configured to analyze data collected and processed by the modules 116 and 118 to determine whether and when to engage or otherwise trigger the battery position actuators 114 to modify the positioning of the batteries 110 relative to a housing of the computing device 100. This may include, for example, setting various temperature and load thresholds and determining whether readings from the sensors 112 exceed one or more of such thresholds.

In some embodiments, a device-wide threshold temperature $X_1$ is set, and the battery position actuation module 120 is configured to compare temperature readings or other measurements $Y_1, Y_2, \ldots Y_k$ obtained from sensors 112 by the computing device monitoring module 116 to determine whether a threshold number $Z_1$ of the measurements $Y_1, Y_2, \ldots Y_k$ exceeds $X_1$. If so, the battery position actuation module 120 may engage the battery position actuators 114 to modify the position of the batteries 110 (e.g., to "pop out" battery cell packs as illustrated in FIGS. 3A-3B and 4A-4B). On detecting that a threshold number $Z_2$ of the measurements $Y_1, Y_2, \ldots Y_k$ fall below a device-wide threshold temperature $X_2$, then the battery position actuation module 120 is configured to engage the battery position actuations 114 to retract the batteries 110 to their original positioning within the housing of the computing device 100.

In some embodiments, $Z_1$ is set to 1 and the battery position actuation module 120 engages the battery position actuators 114 to pop out the batteries 110 when any one of the measurements or readings $Y_1, Y_2, \ldots Y_k$ exceed $X_1$. In other embodiments, $Z_1$ may be greater than 1 such that multiple ones of the measurements or readings $Y_1, Y_2, \ldots Y_k$ must exceed $X_1$ before the battery position actuation module 120 engages the battery position actuators 114 to pop out the batteries 110. The threshold $Z_2$ may similarly vary. Further, the thresholds $X_1$ and $X_2$ may differ (e.g., $X_2$ may be greater than $X_1$). Further, the battery position actuation module 120 may engage the battery position actuators 114 to retract the batteries 110 to their original positioning within the housing of the computing device 100 some designated time $T_1$ after they have been popped out in addition to or instead of retracting the batteries 110 responsive to a comparison of the readings $Y_1, Y_2, \ldots Y_k$ and the threshold $X_2$.

Rather than setting or using device-wide threshold temperatures $X_1$ and $X_2$, multiple component-specific or sensor-specific thresholds may be used. For example, a threshold $X_{1-1}$ may be defined for monitoring temperature readings from processor 102, a threshold $X_{1-2}$ may be defined for monitoring temperature readings from storage devices 108, etc. When a designated number of component-specific measurements (which may be 1) exceed or fall below their associated component-specific temperature thresholds, the battery position actuation module 120 may engage the battery position actuators 114 accordingly to pop out or retract the batteries 110.

As described above, the sensors 112 are not limited solely to use in obtaining temperature readings. In some embodiments, the sensors 112 may measure load or usage of the computing device 100 or components thereof. In such cases, formulas may be defined for converting load or usage readings to a temperature for comparison against the above-described temperature thresholds, or additional load or usage-based thresholds may be defined and utilized to determine whether and when the battery position actuation module 120 should engage or otherwise trigger the battery position actuators 114 to pop out or retract the batteries 110.

The battery position actuation module 120 may also utilize charging status as determined from the battery charge detection module 118 for determining whether and when to engage the battery position actuators 114 to pop out or retract the batteries 110. For example, the battery position actuation module 120 may determine whether the batteries 110 have been charging for at least a designated threshold time $T_2$ before actuating the battery position actuators to pop out the batteries 110, and may determine whether the batteries 110 have been discharging for at least a designated threshold time $T_3$ before actuating the battery position actuators 114 to retract the batteries 110.

As shown in FIGS. 3A-3B and 4A-4B, in some embodiments the batteries 110 of a computing device 100 are arranged in multiple battery cell packs 301, 401. In such cases, the battery position actuation module 120 may be configured to independently control actuation of the battery position actuators 114 for each of the battery cell packs 301, 401. For example, the battery position actuation module 120 may be configured to pop out only one of the battery cell packs 301 and 401 based on the readings or measurements from sensors 112 and the charging status of batteries 110. Consider, as an example, that the battery cell pack 301-1 of laptop 300 is located adjacent or proximate to a GPU of the laptop 300, while the battery cell pack 301-2 of the laptop 300 is located adjacent or proximate to an SSD of the laptop 300. Further assume that the GPU and SSD each have component-specific temperature sensors. In this example, the battery position actuation module 120 may independently engage different ones of the battery position actuators based on the component-specific readings from the GPU and SSD. If the GPU's temperature reading exceeds some temperature threshold while the SSD's temperature reading does not, then only the battery cell pack 301-1 may be popped out while the battery cell pack 301-2 remains in its original position within the housing of laptop 300.

The battery position actuation module 120 may also be configured to actuate battery position actuators 114 so as to independently pop out different battery cell packs or batteries in a pre-determined sequence. For example, on detecting that sensors 112 report temperature readings exceeding a first threshold, a first battery cell pack may be popped out from its housing to create a first air duct or vent. If the sensors 112 report that temperature readings exceed a second threshold, a second battery cell pack may be popped out from its housing to create a second air duct or vent.

Different battery cell packs or batteries may also be separately controlled based on feedback from the modules 116 and 118. For example, if the computing device monitoring module 116 reports a first designated condition, a first set of the battery cell packs may be actuated. If the battery charging detection module 118 reports a second designated condition, a different second set of the battery cell packs may be actuated. If both the first and second designated conditions are reported by modules 116 and 118, both the first and second sets of battery cell packs may be actuated, or a third set of battery cell packs may be actuated.

In some embodiments, feedback or designated conditions reported by modules 116 and 118 individually would not be enough for the battery position actuation module 120 to engage the battery position actuators 114 to pop out or retract the batteries 110. However, the battery position actuation module 120 may determine that the collective feedback from the modules 116 and 118 should result in engagement of the battery position actuators 114. Consider, as an example, a situation where none of the temperature measurements $Y_1, Y_2, \ldots Y_k$ exceed the device-wide temperature threshold $X_1$, but one or more of the temperature measurements $Y_1, Y_2, \ldots Y_k$ exceed a conditional device-wide temperature threshold $X_3$. The battery position actuation module 120 will not trigger the battery position actuators when one or more of the temperature measurements $Y_1, Y_2, \ldots Y_k$ exceed a conditional device-wide temperature threshold $X_3$ unless some other condition is met (e.g., some threshold usage measurements, based on the charging status of the batteries 110, etc.).

Although various embodiments are described above in the context of comparing readings from sensors 112 reported by computing device monitoring module 116 or a charging status of batteries 110 reported by battery charging detection module 118 to respective static thresholds, embodiments are not so limited. The computing device monitoring module 116, for example, may monitor readings or measurements from sensors 112 over time to identify trends in such readings or measurements. If such trends indicate that triggers are expected to be met within some designated time period, the battery position actuation module 120 may proactively engage the battery position actuators 114 in response (e.g., to pop out the batteries 110 before the computing device 100 heats too much, to retract the batteries 110 as the computing device 100 cools, etc.). Further, the various thresholds may be adjusted dynamically, such as responsive to determining that the health of batteries 110 have been degraded (e.g., so as to more aggressively trigger the battery position actuators 114), responsive to user feedback, etc.

At least portions of the computing device monitoring module 116, battery charging detection module 118 and battery position actuation module 120 may be implemented at least in part in the form of software that is stored in memory 104 and executed by one or more of the processors 102. It should also be appreciated that the functionality of the modules 116, 118 and 120 may be implemented by another computing or processing device that is distinct from computing device 100. For example, the functionality of modules 116, 118 and 120 may be provided by an application or service hosted in a cloud computing platform.

It is to be understood that the particular set of elements shown in FIG. 1 for battery protection and intelligent cooling is presented by way of illustrative example only, and in other embodiments additional or alternative elements may be used. Thus, another embodiment may include additional or alternative components within the computing device 100, as well as different arrangements of modules and other components.

Figure 8:
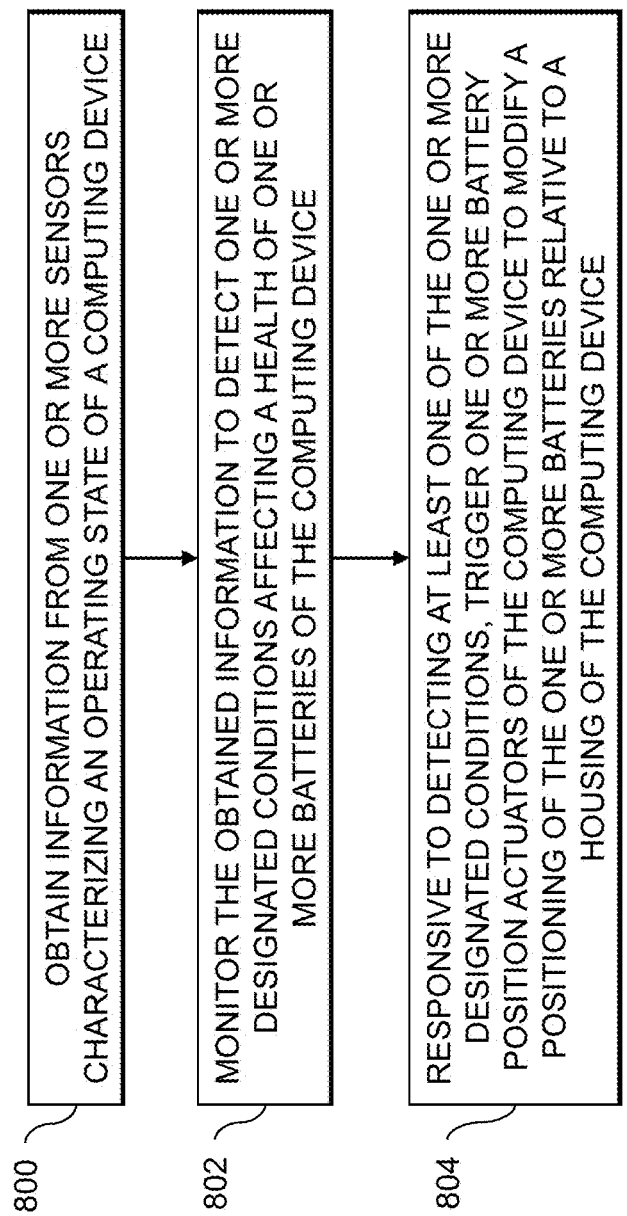
FIG. 8 is a flow diagram of an exemplary process for battery protection and intelligent cooling in an illustrative embodiment.

An exemplary process for battery protection and intelligent cooling will now be described in more detail with reference to the flow diagram of FIG. 8. It is to be understood that this particular process is only an example, and that additional or alternative processes for battery protection and intelligent cooling may be used in other embodiments.

In this embodiment, the process includes steps 800 through 804. These steps are assumed to be performed by the computing device 100 utilizing the computing device monitoring module 116, battery charging detection module 118 and battery position actuation module 120. The process begins with step 800, obtaining information from one or more sensors (e.g., 112) characterizing an operating state of a computing device (e.g., 100). The computing device may comprise a laptop. In step 802, the obtained information is monitored to detect one or more designated conditions affecting a health of one or more batteries (e.g., 110) of the computing device.

In some embodiments, the information characterizing the operating state of the computing device obtained in step 800 comprises a charging state of the one or more batteries and at least one of the designated conditions monitored for in step 802 comprises determining that the one or more batteries have been in a charging state for at least a designated threshold period of time. In other embodiments, the information characterizing the operating state of the computing device obtained in step 800 comprises one or more usage measurements, and at least one of the one or more designated conditions monitored for in step 802 comprises determining that the one or more usage measurements have exceed a designated threshold usage for at least a designated threshold period of time. The one or more usage measurements may comprise at least one measure of usage of one or more components of the computing device (e.g., a processor thereof). In still other embodiments, the information characterizing the operating state of the computing device obtained in step 800 comprises one or more temperature measurements, and at least one of the one or more designated conditions monitored for in step 802 comprises determining that the one or more temperature measurements have exceed a designated threshold temperature for at least a designated threshold period of time. The one or more temperature measurements may be obtained from one or more of the sensors at one or more locations associated with the housing, from one or more of the sensors comprised within one or more components of the apparatus, etc. In further embodiments, combinations of the above information and designated conditions may be utilized.

Responsive to detecting at least one of the one or more designated conditions, one or more battery position actuators (e.g., 114) of the computing device are triggered in step 804 to modify a positioning of the one or more batteries relative to a housing of the computing device. In some embodiments, the one or more batteries comprise a first battery arranged proximate a first lateral edge of the housing and a second battery arranged proximate a second lateral edge of the housing, and step 804 includes at least one of: rotating the first battery outward from the first lateral edge of the housing creating a first air duct vent at the first lateral edge of the housing; and rotating the second battery outward from the second lateral edge of the housing creating a second air duct vent at the second lateral edge of the housing. The one or more battery position actuators may comprise a first rotational angular bracket mechanically coupled to the first battery and a second rotational angular bracket mechanically coupled to the second battery. The first battery comprises a first battery cell pack and the second battery comprises a second battery cell pack, the first battery cell pack being electrically coupled to the second battery cell pack.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It should again be emphasized that the above-described embodiments are presented for purposes of illustration only. Many variations and other alternative embodiments may be used. For example, the disclosed techniques are applicable to a wide variety of other types of computing devices, components, sensors, actuators, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. An apparatus comprising:
a housing;
at least one processing device disposed within the housing, the at least one processing device comprising a processor coupled to a memory;
one or more sensors communicatively coupled to the at least one processing device;
one or more batteries configured to provide electrical power to the at least one processing device; and
one or more battery position actuators configured to modify a positioning of the one or more batteries relative to the housing;
the at least one processing device being configured to perform steps of:
obtaining information from the one or more sensors characterizing an operating state of the apparatus;
monitoring the obtained information to detect one or more designated conditions affecting a health of the one or more batteries; and
responsive to detecting at least one of the one or more designated conditions, triggering the one or more battery position actuators to modify the positioning of the one or more batteries relative to the housing;
wherein the one or more batteries comprise a first battery arranged proximate a first lateral edge of the housing and a second battery arranged proximate a second lateral edge of the housing; and wherein triggering the one or more battery position actuators to modify the positioning of the one or more batteries relative to the housing comprises at least one of:
    rotating the first battery outward from the first lateral edge of the housing creating a first air duct vent at the first lateral edge of the housing; and
    rotating the second battery outward from the second lateral edge of the housing creating a second air duct vent at the second lateral edge of the housing.

2. The apparatus of claim 1 wherein the apparatus comprises a laptop computing device.

3. The apparatus of claim 1 wherein the information characterizing the operating state of the apparatus comprises a charging state of the one or more batteries.

4. The apparatus of claim 3 wherein said at least one of the one or more designated conditions comprises determining that the one or more batteries have been in a charging state for at least a designated threshold period of time.

5. The apparatus of claim 1 wherein the information characterizing the operating state of the apparatus comprises one or more usage measurements, and wherein said at least one of the one or more designated conditions comprises determining that the one or more usage measurements have exceeded a designated threshold usage for at least a designated threshold period of time.

6. The apparatus of claim 5 wherein the one or more usage measurements comprise at least one measure of usage of one or more components of the apparatus.

7. The apparatus of claim 6 wherein said at least one measure of usage of the one or more components of the apparatus comprises a measure of usage of the processor of the apparatus.

8. The apparatus of claim 1 wherein the information characterizing the operating state of the apparatus comprises one or more temperature measurements, and wherein said at least one of the one or more designated conditions comprises determining that the one or more temperature measurements have exceeded a designated threshold temperature for at least a designated threshold period of time.

9. The apparatus of claim 8 wherein the one or more temperature measurements are obtained from one or more of the sensors at one or more locations associated with the housing.

10. The apparatus of claim 8 wherein the one or more temperature measurements are obtained from one or more of the sensors comprised within one or more components of the apparatus.

11. The apparatus of claim 1 wherein the information characterizing the operating state of the apparatus comprises two or more of:
    a charging state of the one or more batteries;
    one or more usage measurements; and
    one or more temperature measurements.

12. The apparatus of claim 1 wherein the one or more battery position actuators comprise a first rotational angular bracket mechanically coupled to the first battery and a second rotational angular bracket mechanically coupled to the second battery.

13. The apparatus of claim 1 wherein the first battery comprises a first battery cell pack and the second battery comprises a second battery cell pack, the first battery cell pack being electrically coupled to the second battery cell pack.

14. The apparatus of claim 12 where at least one of the one or more battery position actuators comprises an actuator base, a fixed disc, a rotatable disc, and one or more connectors that couple the rotatable disc to at least one of the one or more batteries.

15. A method comprising steps of:
    obtaining information from one or more sensors characterizing an operating state of a computing device;
    monitoring the obtained information to detect one or more designated conditions affecting a health of one or more batteries of the computing device; and
    responsive to detecting at least one of the one or more designated conditions, triggering one or more battery position actuators of the computing device to modify a positioning of the one or more batteries relative to a housing of the computing device;
    wherein the one or more batteries comprise a first battery arranged proximate a first lateral edge of the housing and a second battery arranged proximate a second lateral edge of the housing; and
    wherein triggering the one or more battery position actuators to modify the positioning of the one or more batteries relative to the housing comprises at least one of:
        rotating the first battery outward from the first lateral edge of the housing creating a first air duct vent at the first lateral edge of the housing; and
        rotating the second battery outward from the second lateral edge of the housing creating a second air duct vent at the second lateral edge of the housing; and
    wherein the method is performed by at least one processing device comprising a processor coupled to a memory.

16. The method of claim 15 wherein the information characterizing the operating state of the computing device comprises at least one of a charging state of the one or more batteries, one or more usage measurements, and one or more temperature measurements.

17. The method of claim 15 wherein the one or more battery position actuators comprise a first rotational angular bracket mechanically coupled to the first battery and a second rotational angular bracket mechanically coupled to the second battery.

18. A computer program product comprising a non-transitory processor-readable storage medium having stored therein program code of one or more software programs, wherein the program code when executed by at least one processing device causes the at least one processing device to perform steps of:
    obtaining information from one or more sensors characterizing an operating state of a computing device;
    monitoring the obtained information to detect one or more designated conditions affecting a health of one or more batteries of the computing device; and
    responsive to detecting at least one of the one or more designated conditions, triggering one or more battery position actuators of the computing device to modify a positioning of the one or more batteries relative to a housing of the computing device;
    wherein the one or more batteries comprise a first battery arranged proximate a first lateral edge of the housing and a second battery arranged proximate a second lateral edge of the housing; and
    wherein triggering the one or more battery position actuators to modify the positioning of the one or more batteries relative to the housing comprises at least one of:

rotating the first battery outward from the first lateral edge of the housing creating a first air duct vent at the first lateral edge of the housing; and rotating the second battery outward from the second lateral edge of the housing creating a second air duct vent at the second lateral edge of the housing.

19. The computer program product of claim 5 wherein the information characterizing the operating state of the computing device comprises at least one of a charging state of the one or more batteries, one or more usage measurements, and one or more temperature measurements.

20. The computer program product of claim 18 wherein the one or more battery position actuators comprise a first rotational angular bracket mechanically coupled to the first battery and a second rotational angular bracket mechanically coupled to the second battery.

\* \* \* \* \*